United States Patent [19]
Cappuyns

[11] Patent Number: 6,152,979
[45] Date of Patent: *Nov. 28, 2000

[54] AIR CLEANER FILTER WITH REMOVABLE JACKET; AND METHOD

[75] Inventor: Jan Cappuyns, Nossegem, Belgium

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/182,123

[22] Filed: Oct. 29, 1998

[51] Int. Cl.$^7$ .................................................. B01D 27/08
[52] U.S. Cl. ........................... 55/385.3; 55/498; 55/502; 55/506; 55/510
[58] Field of Search ................................ 55/330, 385.3, 55/498, 502, 503, 510, 506, 507, 509; 123/198 E

[56] References Cited

U.S. PATENT DOCUMENTS

| | | |
|---|---|---|
| 2,519,897 | 8/1950 | Framer . |
| 2,962,121 | 11/1960 | Wilber . |
| 2,973,832 | 3/1961 | Cook et al. . |
| 3,190,058 | 6/1965 | Farr et al. . |
| 3,226,917 | 1/1966 | Donovan et al. . |
| 3,429,108 | 2/1969 | Larson . |
| 3,494,111 | 2/1970 | Hathaway ................................. 55/506 |
| 3,535,853 | 10/1970 | Brown et al. . |
| 3,811,251 | 5/1974 | Gibel . |
| 3,864,109 | 2/1975 | Hansen . |
| 4,157,902 | 6/1979 | Tokar . |
| 4,203,739 | 5/1980 | Erdmannsdorfer . |
| 4,350,509 | 9/1982 | Alseth et al. . |
| 4,419,113 | 12/1983 | Smith . |
| 4,516,994 | 5/1985 | Kocher . |
| 4,632,682 | 12/1986 | Erdmannsdorfer . |
| 4,720,292 | 1/1988 | Engel et al. . |
| 4,735,640 | 4/1988 | Thornburgh et al. . |
| 4,759,783 | 7/1988 | Machado . |
| 4,764,191 | 8/1988 | Morelli . |
| 4,848,989 | 7/1989 | Maeda . |
| 5,006,235 | 4/1991 | Cooper . |
| 5,112,372 | 5/1992 | Boeckermann et al. . |
| 5,238,474 | 8/1993 | Kahlbaugh et al. . |
| 5,277,157 | 1/1994 | Teich ...................................... 55/385.3 |
| 5,431,706 | 7/1995 | Paas ....................................... 55/385.3 |
| 5,613,992 | 3/1997 | Engel . |
| 5,641,342 | 6/1997 | Smith et al. ............................... 55/506 |
| 5,720,788 | 2/1998 | Puckett et al. .......................... 55/385.3 |
| 5,755,842 | 5/1998 | Patel et al. ............................. 55/385.3 |
| 5,800,581 | 9/1998 | Gielink et al. .......................... 55/385.3 |
| 5,893,937 | 4/1999 | Moessinger ............................. 55/385.3 |
| 5,901,681 | 5/1999 | Mueller .................................. 55/385.3 |
| 5,919,279 | 6/1999 | Merritt et al. .......................... 55/385.3 |

FOREIGN PATENT DOCUMENTS

| | | |
|---|---|---|
| 0 676 228 A1 | 10/1995 | European Pat. Off. . |
| 2 338 734 | 8/1981 | France . |
| 1 000 074 | 2/1983 | U.S.S.R. . |
| 2 075 364 | 11/1981 | United Kingdom . |
| 2 181 967 | 5/1987 | United Kingdom . |

*Primary Examiner*—David A. Simmons
*Assistant Examiner*—Minh-Chau T. Pham
*Attorney, Agent, or Firm*—Merchant & Gould P.C.

[57] ABSTRACT

An air cleaner assembly includes a filter element and a outer jacket. The filter element has a first end cap with a central opening therein for airflow communication with the filter interior. The second end cap is a closed end cap having spaced radially directed projections and spaced, axially directed projections. The outer jacket is selectively mountable and dismountable on the filter element upon axial relative movement between the jacket and the element. The jacket includes a locking member positioned to selectively engage the jacket with the second end cap radial projections and to secure the jacket on the filter element. The radial projections engage the jacket and support the jacket spaced from a remainder of the second end cap sufficiently to provide an airflow inlet arrangement. In one example, the locking member includes a bead circumferentially lining the inner wall of the jacket. Each of the radial projections on the second end cap selectively engages the bead. Engine air flow systems using an air cleaner assembly are described. Methods for installing and changing out a filter element in an air cleaner include tilting a filter element at an angle relative to a longitudinal axis of the housing, and after tilting the filter element, straightening the element and axially moving one of the element and the housing relative to the other two position the element inside of the housing.

27 Claims, 10 Drawing Sheets

6,152,979

AIR CLEANER FILTER WITH REMOVABLE JACKET; AND METHOD

FIELD OF THE INVENTION

The present invention relates to air cleaners. It particularly concerns air cleaners for filtering a particulate material from engine air intake streams. The invention concerns arrangements having an outer jacket circumscribing a removable and replaceable filter media component or element. The disclosure also concerns methods of assembly and use.

BACKGROUND OF THE INVENTION

In general, air cleaner arrangements are utilized to filter combustion air in streams for various engine applications, including for example, for vehicles and stationary engines. In general, the air cleaner arrangements include housings circumscribing internally received filter elements. Periodically, the filter elements need to be removed for servicing or replacement, as the elements become subject to loading of contaminants thereon, during use.

SUMMARY OF THE INVENTION

One aspect of the disclosure describes an air cleaner assembly having a filter element and an outer jacket. The filter element includes first and second end caps with a region of media extending therebetween. In preferred systems, the first end cap has a central opening in airflow communication with an internal volume of the region of filter media. Preferably, the second end cap is a closed end cap with a plurality of spaced, radially directed projections thereon. The jacket is selectively mountable and dismountable on the filter element upon axial movement of at least one of the jacket and element relative to the other. The jacket preferably includes a locking member positioned to selectively engage the jacket with the second end cap radial projections to secure the jacket on the filter element. Preferably, the radial projections engage the jacket and support the jacket spaced from a remainder of the second end cap sufficiently to provide an airflow inlet arrangement for flow of air between a volume in the jacket interior and circumscribing the filter element, and a region exterior of the assembly.

Another aspect of the disclosure describes a filter element arrangement. The filter element arrangement preferably includes a first end cap at a first end and defining an airflow opening therethrough. A second end cap is at a second end opposite of the first end. The second end cap preferably includes a main section defining a periphery, a plurality of radial projections, and a plurality of axial projections extending from a remainder of the second end cap. The radial projections are preferably spaced to define airflow channels therebetween. Each of the radial projections preferably extends from the main section beyond the periphery. Each of the axial projections preferably extends axially at least 10 mm from the remainder of the second end cap. Preferably, an extension of the filter media extends between the first and second end caps and defines an open filter interior. The open filter interior is an airflow communication with the airflow opening in the first end cap.

Another aspect of the disclosure describes an engine airflow system comprising an engine and an air filter assembly. The air filter assembly is preferably mounted on a framework and arranged to filter engine intake air to the engine. The air filter assembly includes a filter element and an outer jacket. The jacket is selectively mountable and dismountable on the filter element upon axial movement of at least one of the jacket and element relative to the other. In preferred systems, the jacket includes a locking member positioned to selectively engage the jacket with the second end cap radial projections and to secure the jacket on the filter element. The radial projections preferably engage the jacket and support the jacket spaced from a remainder of the second end cap sufficiently to provide a airflow inlet arrangement for flow of air between a volume in the jacket interior and circumscribing the filter element and a region exterior of the assembly.

Methods for changing out a filter element in an air cleaner are disclosed. In one preferred method, a housing defining an open interior is provided. A filter element is oriented into the open interior of the housing. Preferably, this includes steps of tilting the filter element at an angle relative to a longitudinal axis of the housing. After tilting the filter element, the filter element is straightened and one of the element and housing is moved axially relative to the other to position the element inside of the housing.

DETAILED DESCRIPTION OF THE PREFERRED EMBODIMENT

Figure 1:
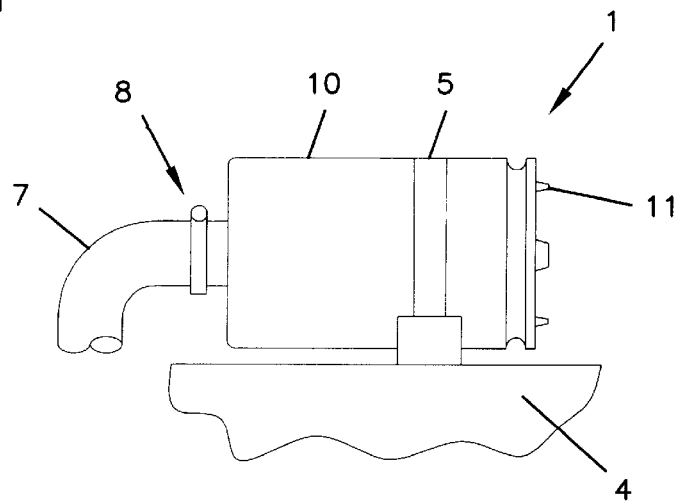
FIG. 1 is a schematic side elevational view of an air cleaner assembly according to the present invention depicted mounted in association with an engine air intake system.

Referring to FIG. 1, reference 1 designates an air cleaner assembly according to the present invention. The air cleaner assembly 1, in FIG. 1, is depicted in schematic, in an environment of use. Specifically, the air cleaner assembly 1 is shown mounted to the framework 4 of a vehicle, by a clamp or mounting band 5. The air cleaner 1 is also shown secured to an engine air intake duct 7 by circumferential hose clamp 8.

The air cleaner 1 includes an outer wall, shell or jacket 10, and an inner removable and replaceable cartridge or filter element 11.

Figure 2:
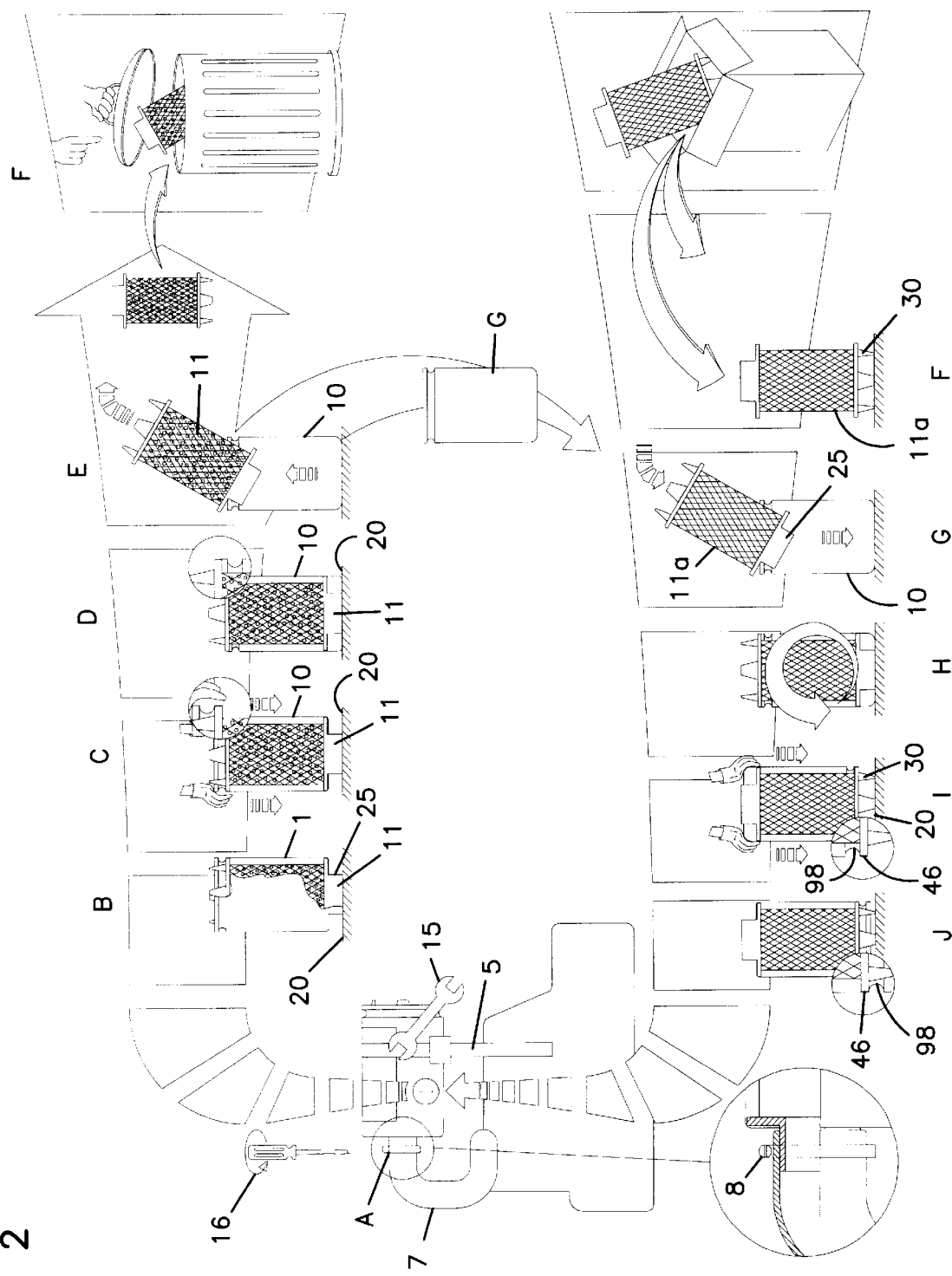
FIG. 2 is a schematic depiction of steps of a method of refurbishing the air cleaner arrangement of FIG. 1.

Before a detailed presentation of parts and components of air cleaner assembly 1 is presented, a brief description of the use of the assembly 1 is provided, in connection with FIG. 2. Referring to FIG. 2, a schematic is depicted, showing steps of use of the arrangement 1. At station A, the air cleaner 1 is shown mounted in association with an engine air intake duct 7, by clamp 8. The air cleaner 1 is also shown mounted by mounting band 5 to the vehicle framework 4. In the schematic of FIG. 2 representing steps of operation, a wrench is shown at 15 and a screwdriver at 16, for loosening the mounting band 5 and clamp 8, respectively, allowing for dismounting of the arrangement 1. In station B the dismounted arrangement 1 is shown oriented for first step of operation, to refurbish the element 11. Specifically, the arrangement 1 is positioned on the floor of 20, or similar surface, with an outlet, tubular, end cap 25 directed downwardly. At stations C and D, steps of pushing the outer jacket 10 towards the floor 20, i.e. sliding the jacket 10 downwardly (axially) relative to the internal element 11, are shown. As will be understood from further descriptions below in detail, in axially moving the jacket from the position shown in C, to the position shown in D, the jacket 10 is loosened from its secure mounting or connection on the element 11. As a result, as shown at station E, the element 11 can now be lifted out from the interior jacket 10. This allows the element to be disposed of, as indicated at F, or otherwise handled. As indicated at G, the housing or jacket 10 can then be used in association with a new or refurbished element 11a. Referring to station F, a new refurbished element 11a is depicted standing upright on a second end cap 30. At station G, the new element 11a is being shown inserted into the old end cap 10, with end cap 25 directed downward. After the element 11a is loosely inserted into the jacket 10, at H and I steps of inverting the loosely associated arrangement are shown, to place end cap 30 on the floor 20. At steps I and J, pressing off the jacket 10 to axially move it into locking relationship with the element 11, is depicted. The assembly is completed at as shown at J, and the air cleaner can be remounted in association with an engine air intake, as shown at A.

Figure 3:
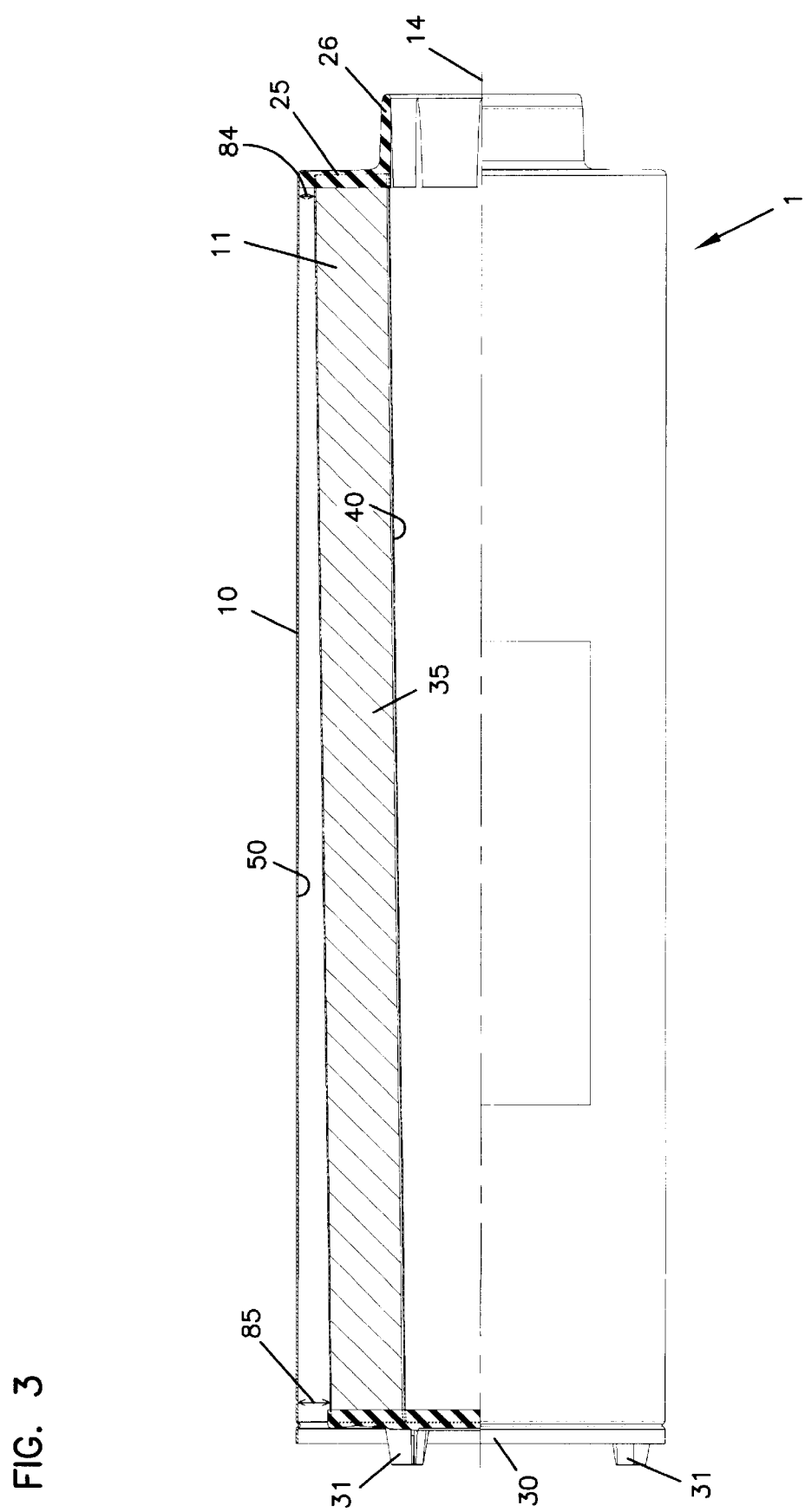
FIG. 3 is a side-elevational, partially cross-sectional view of the air cleaner depicted in FIG. 1.

Herein, the term "axial" and variants thereof, when used to describe relative movement between a jacket 10 and element 11 is meant to refer to movement of at least one, relative to the other, along a central axis of the two, for example axis 14, FIG. 3. Of course, movement could be of the jacket 10, the element 11 or both. The term "relative axial movement" or variants thereof, without more, is not meant to be definitive of which piece(s) move, only that the relative sliding motion occurs.

In general, then, the schematic of FIG. 2 shows that the air cleaner assembly 1 includes two basic components: the jacket 10 and removable element 11. These two parts 10, 11, are configured such that the jacket 10 is provided in a snug, locked, fit on the element 11; the locked fit being created or loosened by hand pressure to move the jacket axially or longitudinally. The assembly 1 is constructed such that the movement of the jacket 10 relative to the element 11, in order to accomplish either loosening of the jacket 10 from the element 11, or locking of the jacket 10 on the element 11, can be accomplished by pressing downwardly on an end or rim of the jacket 10, as shown.

In connection with the remaining figures, the features of the assembly 1 which provide for this preferred operation, is described.

Attention is first directed to FIG. 3, which depicts the arrangement 1 in partial cross-section. As shown in FIG. 3, the assembly 1 includes internally received element 11 and outer jacket 10, defining a central axis 14. The internally received element 11 includes a first open end cap 25 having central tube 26 thereon; a second opposite end cap 30 including a plurality of axial spacers 31 thereon; and, a filter media construction 35 extending between the end caps 25 and 30. For the particular arrangement shown, the media 35 is configured in a pattern defining or circumscribing an internal open volume 40.

Figure 4:
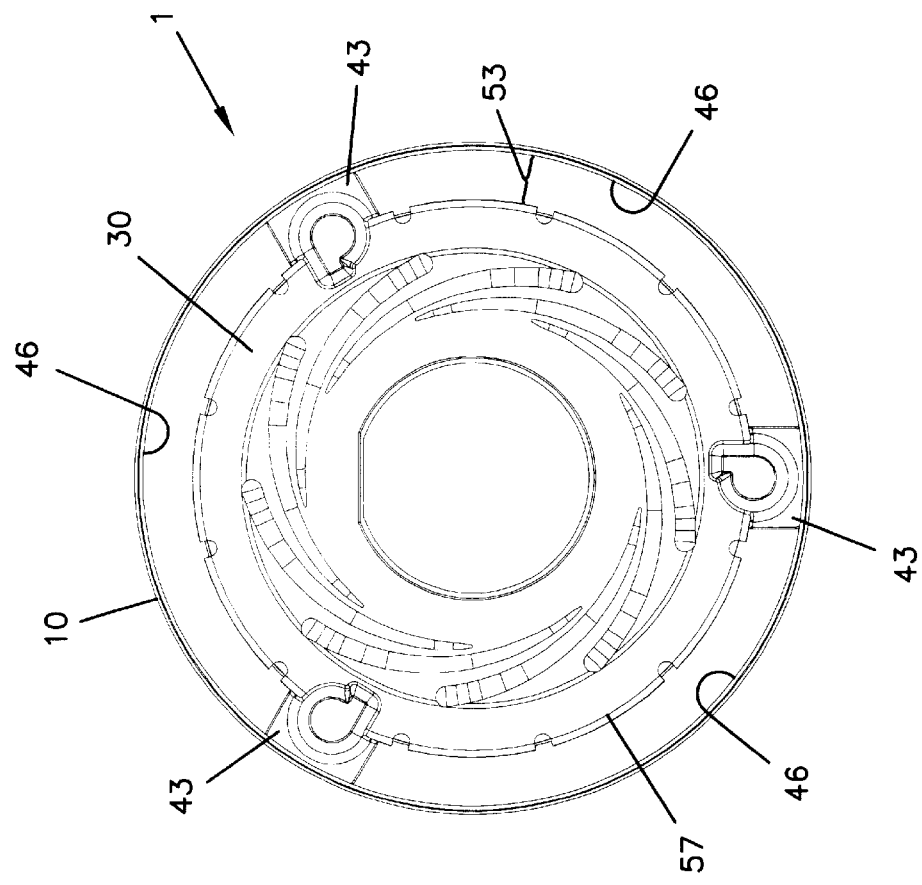
FIG. 4 is an end view of the air cleaner depicted in FIG. 1.

For the preferred arrangement shown, FIG. 4, end cap 30 also includes radially projecting, radially spaced, spacers or projections 43. When the assembly 1 is assembled, as shown in FIGS. 3 and 4, jacket 10 engages spacers 43, as shown, defining open spaces 46 between the jacket 10 and end cap 30, extending radially between the spacers 43. Air to be filtered can enter assembly 1 through spaces 46 around end cap 30. This air, when filtered, becomes distributed in dirty air plenum 50, FIG. 3, between housing 10 and media 35. The air then passes through the media 35, with concomitant filtering, to the clean air side, plenum or space 40, defined in the open interior of the media 35. The air then passes outwardly through outlet opening 55 in center tube 26 of outlet end cap 25, and eventually into appropriate duct work for direction to an engine.

Figure 6:
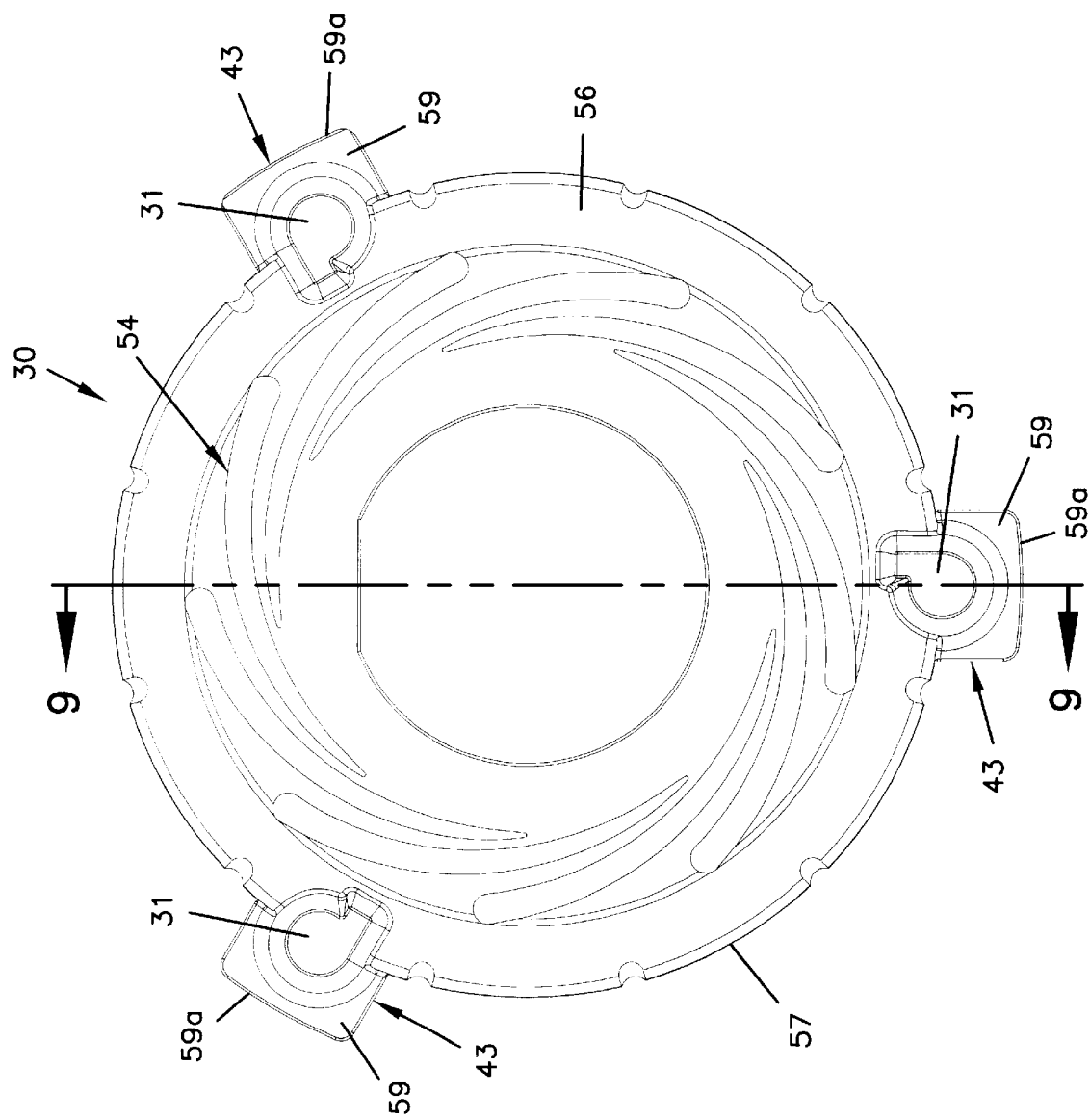
FIG. 6 is an enlarged end view of the element of FIG. 5, taken from the view point of line 6—6, FIG. 5.
Figure 9:
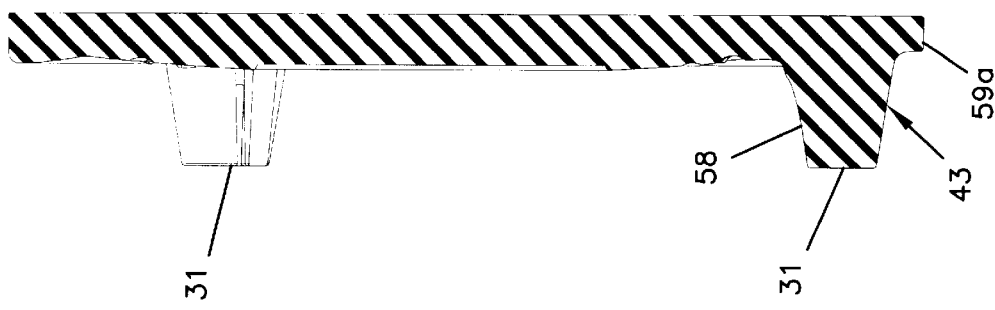
FIG. 9 is a cross-sectional view of the arrangement shown in FIG. 6, taken along line 9—9 thereof.

Attention is directed to FIGS. 6 and 9. FIG. 6 is an end view of one example preferred end cap 30. FIG. 9 is a cross-sectional view of the end cap 30 taken along the line 9—9 in FIG. 6. It can be seen that end cap 30 includes a circular main section 56 with the spacers 43 radially projecting therefrom and spacers 31 axially projecting therefrom. Main section 56 defines an outer perimeter 57. The spacers 43 extend beyond the edge of the perimeter 57. In FIG. 9, it is illustrated that the spacers 43 are aligned with the axial spacers 31. The spacers 43 have a radial projection section 59, while the spacers 31 have axial projection section 58. The axial projection section 58 extends or projects axially from the main section 56. The axial projection section 58 acts as a standoff to help position the jacket 10 over the element 11 when installing a new element. The radial projection section 59 acts to interlock with corresponding locking structure on the jacket 10 in order to selectively position the element 11 within the jacket 10. The radial projection section 59 includes an outermost edge 59a that acts to snap over a bead 98 in the jacket 10, explained in further detail below. While the axial spacers 31 are illustrated as being aligned with and included as the same molded part as radial spacers 43, it should be realized that they need not be aligned, and can be different molded sections.

Still in reference to FIG. 6, note that the axial projection section 58 of the spacers 43 each resemble a small letter "d". For Donaldson, the assignee of the present invention, the shape of the axial projection section 58 resembling a "d" is useful in providing a source identifying mark. Further, it is eye-catching and attractive visually. Note also that at 54, a distinctive swirl figure is molded into the end cap 30. The swirl 54 is indented into the end cap 30, and as such, helps to provide a media stop to the flow of urethane. Although the swirl 54 helps to provide a media stop, it need not be in the distinctive swirl pattern as shown. The distinctive swirl pattern 54 is selected because it is attractive, eye-catching, and distinctive to Donaldson, the assignee of the present invention.

The main section 56 may accommodate a label identifying the product. The main section 56 may also accommodate pad printing or jet printing.

Attention is again directed to FIG. 4. Note the spaces 46 between the perimeter 57 and the jacket 10. As described above, the spaces 46 allow for the inflow of air. The distance between the perimeter 57 and the jacket 10 define a perimeter width 53. This perimeter width can range between 10 and 70 mm, for example, 15–30 mm.

Figure 8B:
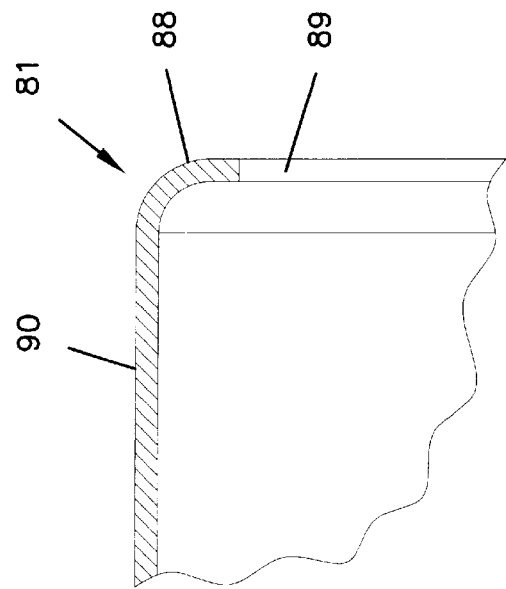
FIG. 8B is an enlarged, fragmented, cross-sectional view of an end portion of the jacket component depicted in FIG. 8A.
Figure 7:
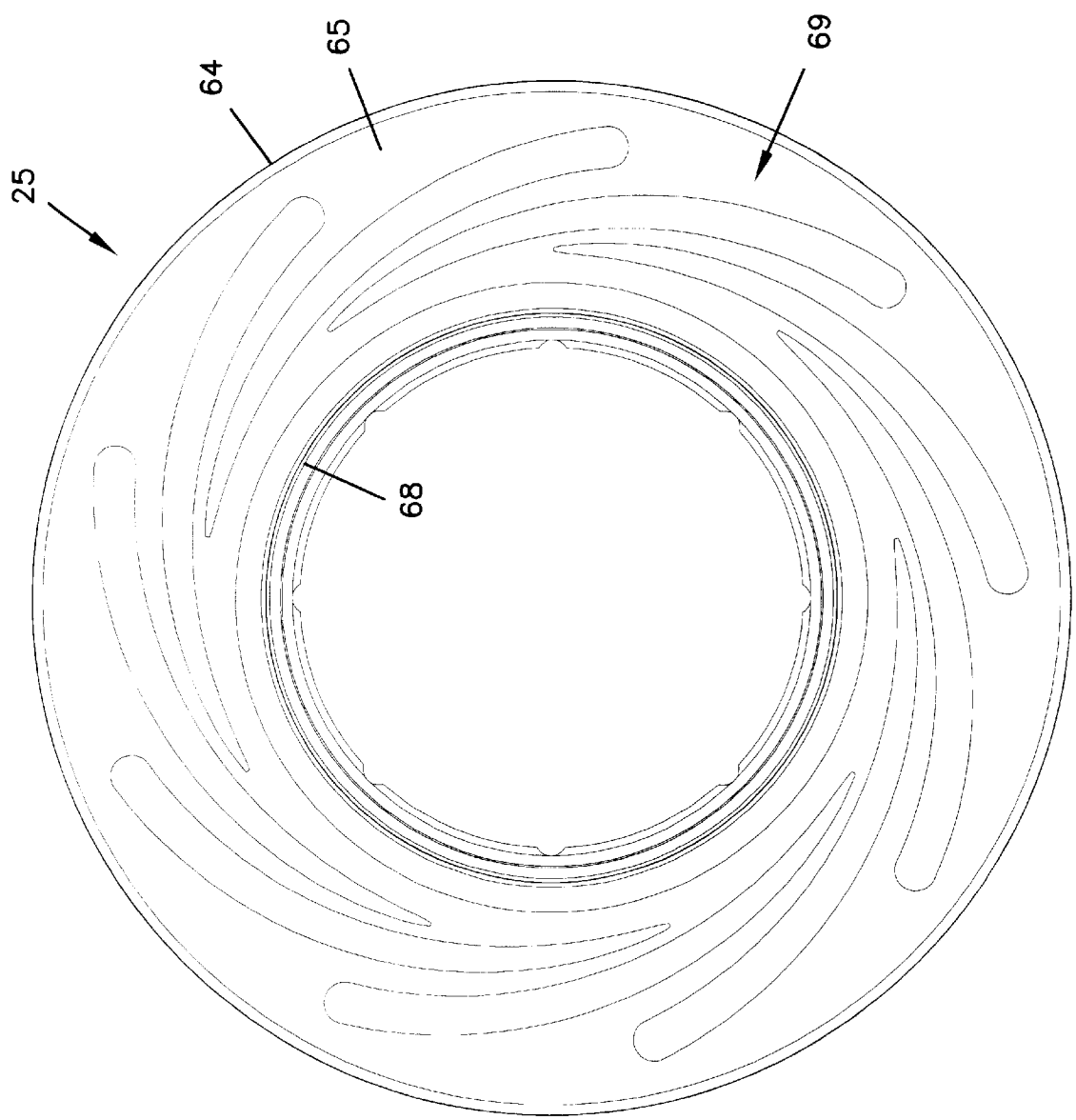
FIG. 7 is an enlarged end view of the element of FIG. 5, taken from the view point of line 7—7, FIG. 5.
Figure 10:
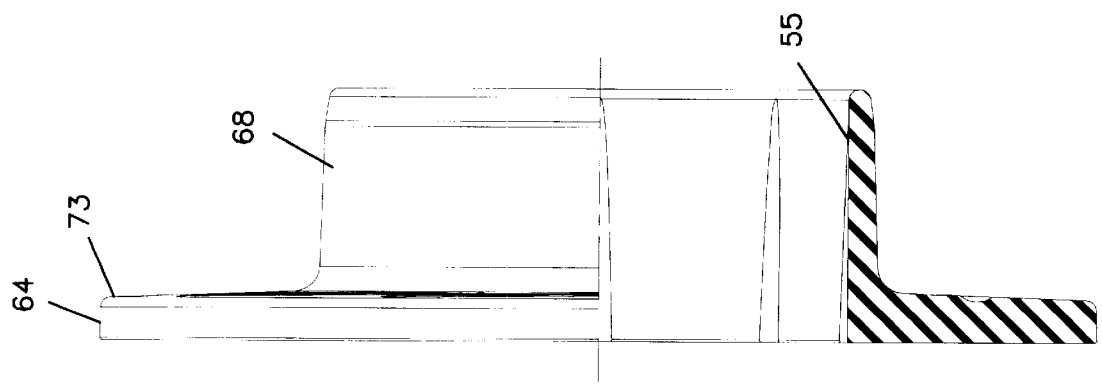
FIG. 10 is a cross-sectional view taken along lines 10—10, FIG. 7.

Turning now to FIGS. 7 and 10, one preferred end cap 25 is illustrated. End cap 25 is shown as generally circular with an outer perimeter 64, a generally planar surface 65, and a cylindrical axially extending outlet tube 68 defining the outlet opening 55. The outlet tube 68 projects or extends outwardly from the planar section 65. The outlet tube 68 is circumscribed by the perimeter 64. As can be seen in FIG. 7, the planar section 65 also defines a distinctive swirl 69. While the primary purpose of distinctive swirl 69 is to provide an aesthetic, eye-catching, attractive appearance and distinctiveness for Donaldson, the assignee of the present invention, it is also, in this embodiment, indented into the planar section 65. The indented portion helps to function as a media stop of the end cap material from flowing into the filter media 60. However, the indented portion need not be in the distinctive swirl 69 shape shown in order to provide the media stop function, as any indents would do. The particular swirl design 69 is used because it is distinctive to Donaldson, as well as being eye catching and attractive. The top 73 of the planar section 65 at the perimeter 64 acts to engage a lip 88 (FIG. 8B) in the jacket 10. This is described further below.

Figure 5:
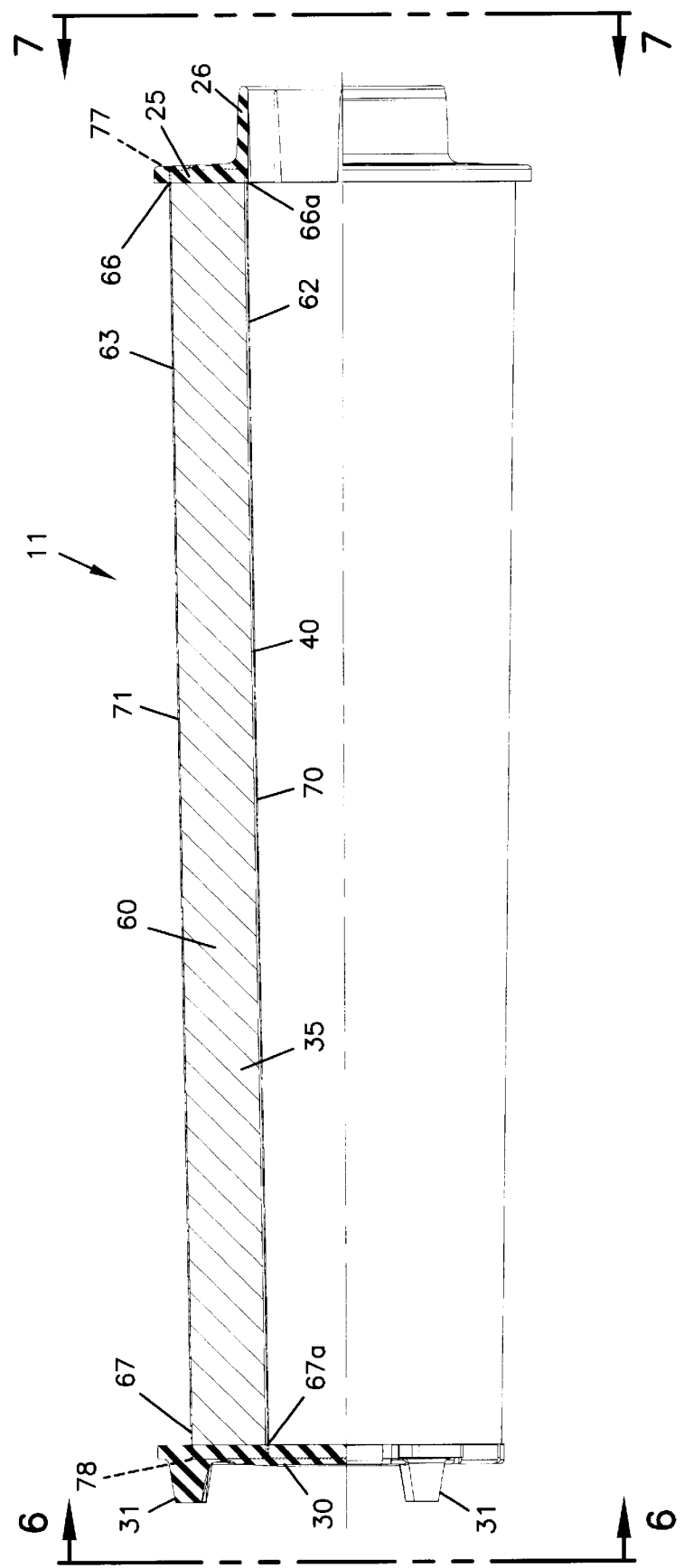
FIG. 5 is a side elevational, partially cross-sectional, view of a filter element component of the air cleaner depicted in FIG. 3.

Attention is now directed to FIG. 5. In FIG. 5, the cartridge or element 11 is depicted in partial cross-sectional view, and separated from the jacket 10. The element 11 comprises media 35 embedded in, and extending between, end caps 25 and 30. For the particular arrangement shown, preferably the media 35 is pleated media 60, for example pleated paper or cellulose. The element 11 is preferably provided with an inner liner 62 and an optional outer liner 63. The inner liner 62 and outer liner 63 are positioned on opposite sides of the media 60, to support the media 60. The liners 62, 63 typically comprise porous members extending between, and typically embedded in, end caps 25 and 30 (independently). A variety of materials can be utilized for the inner and outer liners, for example expanded metal, porous or perforated metal, or porous or perforated plastic constructions. In some applications, the outer liner 63 is omitted.

Still referring to FIG. 5, it is noted that for the preferred embodiment shown, the media 35, inner liner 62 and outer liner 63 each has a somewhat frustoconical shape. That is, the outside diameter in the region indicated at 66, immediately adjacent end cap 25, is larger than the outside diameter indicated in the region immediately adjacent end cap 30. For the typical embodiment, the media 35 is pleated and has a uniform pleat depth, thus the inside diameter also reduces an extension from region 66a to region 67a.

Preferably, the element 11 is constructed such that the reduction in diameter between region 66, 67 or alternately stated between region 66a and 67a, is a relatively even, smooth, gradual reduction rather than a stepped or alternately configured construction. This can be accomplished using a constant pleat depth, and constant spacing between inner liner 62 and outer liner 63, across the expanse between end cap 25 and end cap 30. A preferred extension is such that the angular extension of either the inside edge 70 or the outside edge 71 of the pleated media 60 is along an angle within the range of about 0.25 to 5°, typically about 0.5–1.0°, relative to central axis 75. Preferably, the frustoconical shape to the media 60 is such that the opposite ends 77, 78, of the cone configuration defined by the pleated media 60, terminate in planes substantially parallel to one another. Preferred media configurations are defined in further detail, hereinbelow.

In reference to FIG. 3, note that when the preferred element 11 is constructed to have a frustoconical shape, and the jacket 10 is constructed to be a general cylindrical shape, the dirty air plenum 50 also takes on a somewhat frustoconical shape. For example, the distance between the jacket 10 and the outer liner 63 in the region 84 immediately adjacent to the end cap 25 is smaller than the distance between the outer liner 63 and jacket 10 in the region 85 immediately adjacent to the end cap 30. In other words, the dirty air plenum 50 tapers between regions 85 (adjacent to the inlet 46) to region 84 (adjacent to the outlet 55). As can be seen in FIG. 3, the dirty air plenum 50 has a larger volume at the region 85 than at the region 84. This helps to distribute air flow more evenly and uniformly across the length of the media 35.

Figure 12:
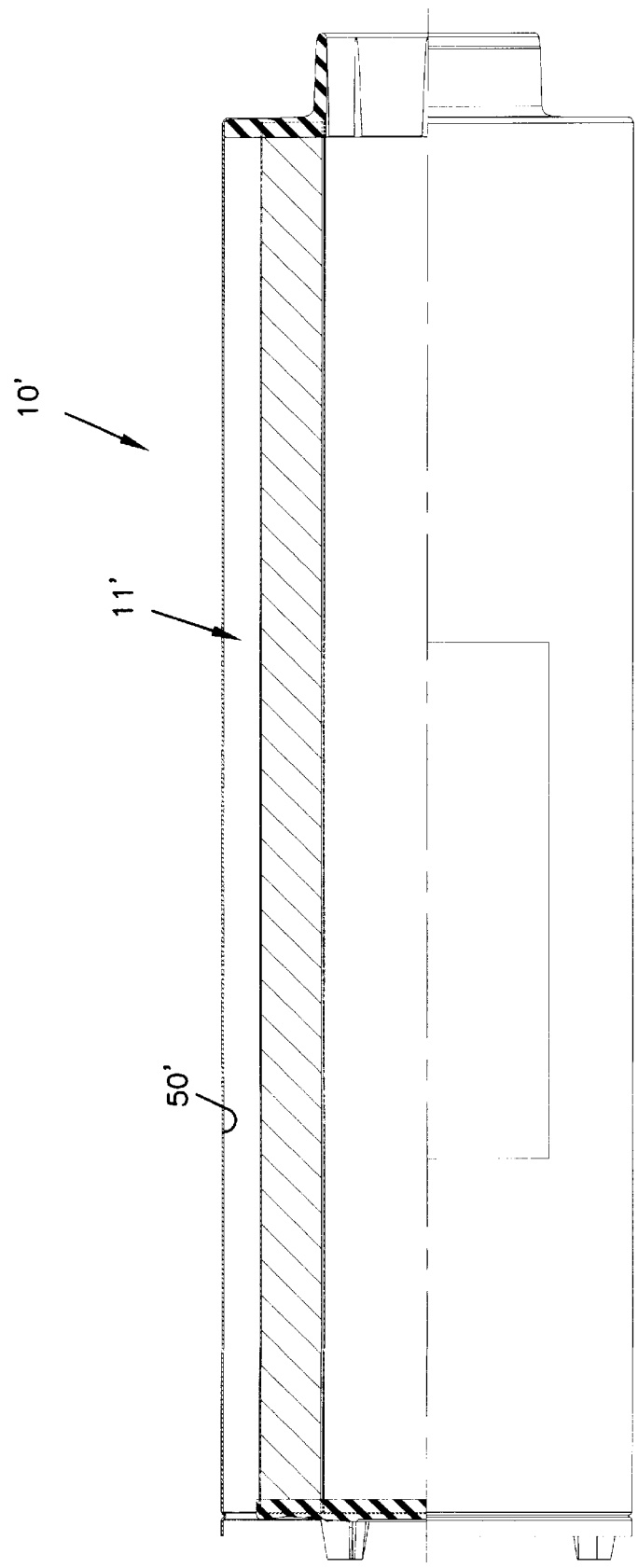
FIG. 12 is a side elevational, partially cross-sectional view of an alternate embodiment of the air cleaner depicted in FIG. 1.

Attention is directed to FIG. 12. FIG. 12 depicts an alternate embodiment of the air cleaner at 1'. In FIG. 12, the element 11 is cylindrical. Thus, the dirty air plenum 50' is also cylindrical.

Figure 8A:
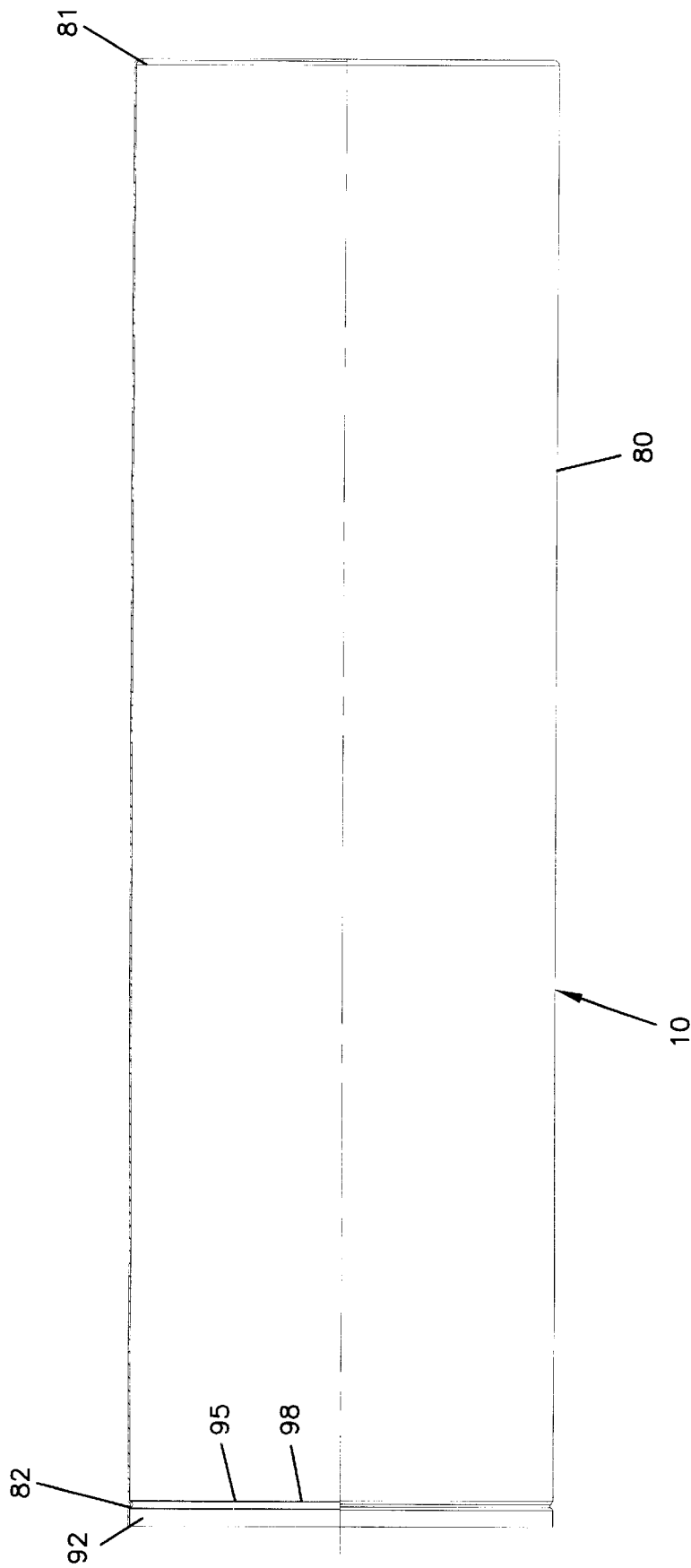
FIG. 8A is a side elevational view of a jacket component for the air cleaner assembly depicted in FIG. 3.

Attention is now directed to FIG. 8A. In FIG. 8A, the jacket 10 is depicted, separate from a remainder of the assembly 1. The jacket 10 comprises an outer circular or tubular member 80 having first and second opposite ends 81 and 82. End 81 is the end of tube 80, or jacket 10, which engages end cap 25, FIG. 3, during assembly. In general, end 81 is configured to engage end cap 25 and stop axial movement between the element 11 and jacket 10. In reference now to FIG. 8B, end 81 defines a depending flange or lip 88. As can be seen in the cross-sectional view of FIG. 8B, lip 88 defines an outermost edge 89. Lip 88 forms a reduced diameter portion of the jacket 10 in order to function as a stop surface for axial engagement and abutment with the end cap 25 of the element 11. The lip 88 has an inside diameter defined by the diameter at inside edge 89 that is smaller than the inside diameter of the jacket 10. While the preferred arrangement shows the lip 88 as being a continuous circumferential surface, in other embodiments, the lip 88 need not be continuous, but could be a plurality of spaced flanges. Preferably, the lip 88 extends a distance from the wall 90 of the jacket 10 between about 1–30 mm, preferably about 3–15 mm.

End 82, on the other hand, is the end that engages end cap 30, FIGS. 3 and 4. End 82 generally includes a locking system having structure for locking with the end cap 30. The locking structure generally selectively engages spacers 43 on the end cap 30. This allows for the jacket 10 to be selectively interlocked with the element 11. In preferred systems, the locking structure includes at least a portion of contoured surfaces along the inner wall 90 of the jacket 10. For example, the contoured portion can include a convex portion extending inwardly. Specifically, one example includes a radial inwardly extending protrusion or projection 95. The projection 95 extends from the wall 90 in order to introduce interference between the end cap 30 and the jacket 10. In the particular embodiment illustrated, the projection 95 comprises a bead 98 or rim circumferentially lining the inner wall 90 of the jacket 10, adjacent to the rim of the end 82. Bead 98 in the embodiment shown, is a region of reduced diameter of the jacket 10 to resemble an inwardly extending band having a generally semi-circular cross-sectional shape. The bead 98 helps to hold the element 11 in place within the jacket 10, after installation of the element 11 in the jacket 10. As can be seen in FIG. 2, at stations I and J, the outermost edge 59a of spacers 43 snap past the bead 98 during assembly.

The end cap 30 is constructed of a material that has at least some flexibility to permit the spacers 43 to move past the bead 98 during assembly and disassembly. At station I in FIG. 2, the spacer 43 is outside of the jacket 10, while at station J, the spacer 43 has snapped past the bead 98 and is within the jacket 10.

During assembly, and in reference now to FIG. 2, the jacket 10 is placed on floor 20. The jacket 10 is positioned so that the end 81 having the lip 88 is positioned on the floor 20, with the opposite end 82 positioned in the up orientation. With the jacket 10 oriented in this manner, the element 11 is moved into the jacket 10. This is done by placing the outlet end cap 25 through the opening 92 defined by the end 82. The element is cocked or angled relative to the jacket 10 in order to move the outlet end cap 25 past the bead 98. In other words, the element 11 is tilted so that a first radial side of the outlet end cap 25 moves past the bead 98 first, and then the element 11 is straightened in axial alignment with the jacket 10, whereby the opposite radial end of the outlet end cap 25 is moved past or snapped over the bead 98. Preferably, the element is initially tilted relative to the jacket 10 at an angle of between 5–50°, preferably about 15–30° relative to a vertical axis parallel to the longitudinal axis of the jacket 10.

The element 11 is moved axially inside the jacket 10 until the outlet tube 68 engages the floor 20. At that point, the entire assembly is inverted, such that the outlet end cap 25 and end 81 is in the upright position, with the standoffs or spacers 31 resting upon the floor 20. Note that in station I of FIG. 2, there is an axial gap between the top 73 of the outlet end cap 25 and the lip 88 of the jacket 10. Note that also in this position, the edge 59a of the radial projection sections 59 are outside of the jacket 10.

Next, the user exerts axial pressure on the end 81. This causes the radial spacers 43, specifically the radial projection sections 59, to deflect and move over or snap over the bead 98. See, for example, station J in FIG. 2. The radial projection section 59 is on the opposite side of the bead 98 as the position shown in station I. The force needed to be exerted by these is sufficiently low such that it can be done by hand, without tools. For example, a force no greater than 40 kg, and typically between 10–35 kg is sufficient to snap the element 11 into the jacket 10.

The air cleaner assembly 1 may then be mounted onto the framework for and attached to duct 7 with clamp 8.

After a period of operation, it will be desirable to change out the filter element 11. The air cleaner assembly 1 will be removed from the framework 4 and oriented so that the outlet tube 68 is resting on the floor 20. The operator exerts a force on the jacket 10 at end 82, again, without tools, by hand, usually no more than 40 kg and typically 10–35 kg. This causes the jacket 10 to move axially relative to the element 11 and snap the radially projecting sections 59 of the radial spacers 46 over the bead 98. The jacket 10 moves axially downward relative to the element 11 until it abuts the floor 20. The user then grasps the element 11 and axially moves the element 11 from the jacket 10. The element 11 is again angled or cocked or tilted relative to the jacket 10 in order to move the outlet end cap 25 over the bead 98. Again, the angle of tilt is about 15–30°, no greater than about 50° relative to a vertical axis. The old element 11 may then be disposed of. Preferably, the element 11 comprises at least 90%, and more preferably 95–100% non-metallic material, such that it may be incinerated upon disposal. The jacket 10 is reusable.

Systems

Figure 11:
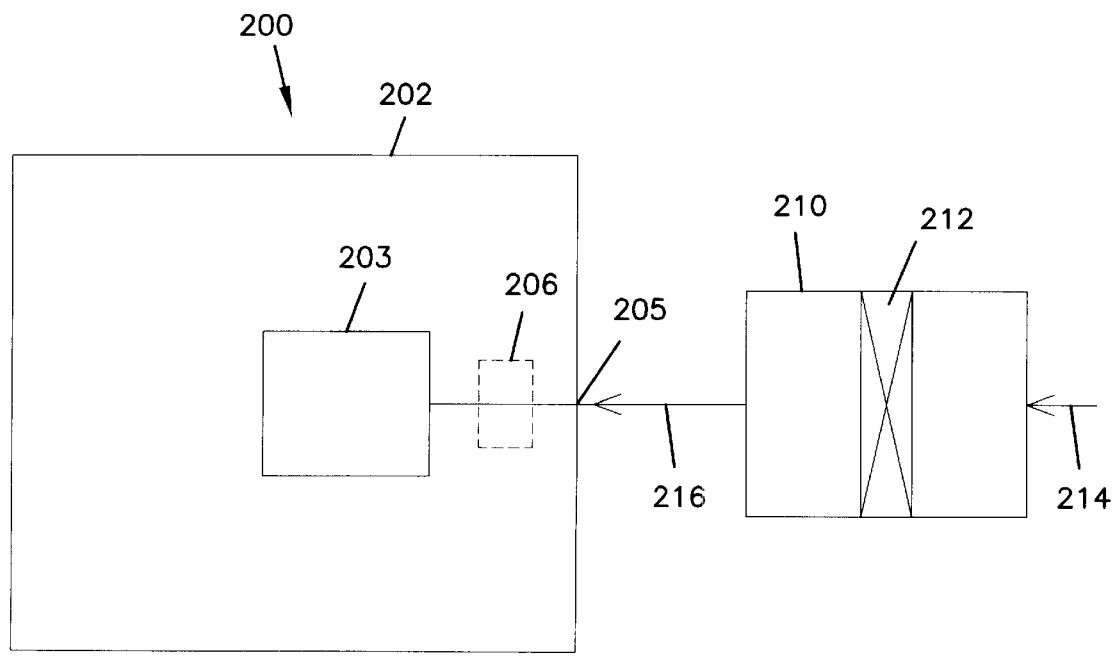
FIG. 11 is a schematic view of a system having an engine intake system and an air cleaner therein.

In FIG. 11, a schematic view of a system is shown generally at 200. System 200 is one example type of system in which air cleaner arrangements and constructions described herein is usable. System 200 may be an industrial type system, such as a generator or pump; or it may be a construction type system, such as an excavator; or it may be a manual type system, such as a powerboat. In FIG. 11, equipment 202 having an engine 203 with some defined rated air flow demand, for example, at least 2 m$^3$/min and typically about 8–17 m$^3$/min, is shown schematically. Equipment 202 may comprise a generator, pump, excavator, or powerboat. Engine 203 powers equipment 202, through use of an air, fuel mixture. In FIG. 11, air flow is shown drawn into engine 203 at an intake region 205. An optional turbo 206 or supercharger or compressor is shown in phantom, as optionally boosting the air intake into the engine 203. An air cleaner 210 having a media pack 212 is upstream of the engine 203 and turbo 206. In general, in operation, air is drawn in at arrow 214 into the air cleaner 210 and through media pack 212. There, particles and contaminants are removed from the air. The cleaned air flows downstream at arrow 216 into the intake 205. From there, the air flows into engine 203, to power equipment 202.

A Preferred Construction

1. Materials

In this section, certain preferred materials are described in detail. It should be understood, of course, that these are only examples of certain useful materials. A variety of other materials may be used, without deviating from principles of the invention.

Preferably, the jacket 10 is constructed of a rigid, durable material. For example, the jacket 10 can be a rigid, nonmetal material, such as a rigid plastic, or maybe metallic, having a thickness of 0.88 mm.

Preferably, all of the components of the element 11 are constructed of a nonmetal material, as such, it is readily incineratable. In alternate constructions, the inner and outer liners 70, 71 can be constructed of expanded metal. Preferably, the inner and outer liners 70, 71 are constructed of plastic.

The media 35 preferably comprises pleated media, for example pleated cellulose paper. One preferred pleated paper has the following properties: frazier permeability of 13–16 ft per min. (4.0–4.9 m. per min.); dry breaking strength of 11–15 lbs per in. (5–6.8 kg per in); wet breaking strength of 6.5–10.0 lbs. per min. (3.0–4.5 kg per in); basis weight of 67–70 lbs/3000 ft$^2$ (109–114 g per m$^2$); a thickness of 0.013–0.015 in. (0.33–0.38 mm); a wet burst strength of at least 13.0 psi (89.6 kPa); a pore size of 43–45 micrometers; a corrugation of 0.016–0.19 in. (0.41–0.48 mm); a dry tea of at least 25 j/m$^2$; a dust loading of at least 200 g/m$^2$ at 8 ft per min. (2.4 m. per min); and gurley stiffness of at least 2000 mg.

Alternatively, media 35 may comprise pleated cellulose paper, as described above, and oil treated, as described in U.S. Pat. No. 5,423,892, incorporated by reference. Oil treated media is particularly useful for marine applications.

In some applications, media 35 may comprise pleated cellulose paper, as described above, and treated with fine fibers, typically less than 5 microns and, in many instances, submicron sized (average) fibers, as described in U.S. Pat. No. 5,423,892, incorporated by reference.

Alternatively, depth media may be used for media 35. Depth media may comprise nonwoven polyester fibers as described in U.S. Pat. No. 5,423,892, incorporated by reference.

The end caps 25 and 30 preferably are constructed of a molded polyurethane material. The polyurethane comprises a material made with 36082 resin and I-3050 isocyanate, supplied by BASF Corporation, Wyandotte, Mich. The materials should be mixed in a mixed ratio of 100 parts resin to 90 parts isocyanate. The cream time is 34+/−2 seconds; the string gel time is 46+/−4 seconds; the top of cup is 53+/−2 seconds; the rise time is 84+/−3 seconds; the tack free time is 92+/−5 seconds; the density is 47.5–50.5 lbs. per cu ft. (761–809 kg per m$^3$).

The end cap material preferably will have a durometer of 30 Shore D minimum average when tested per ASTM D2240 on a production line slab or finished assembly.

The heat stability will include a maximum hardness change of + or −25% when heat soaked at 190 + or −20° F. for 24 hrs, on a test size of 1 in. by 6 in. by 0.125 in. thick. For cold resistance, the material must not crack when flexed over a 2 in. mandrel at −40 + or −20° F. when tested per ASTM D2136. For chemical resistance, the material must not dissolve, crack or blister when soaked in diesel fuel, gasoline, water and D1400 or Kronigel for 72 hrs., with a test size of 1 in. by 6 in. by 0.125 in. thick. The tensile strength should be at least 700 psi at 190+/−20° F. when tested per ASTM D3574 test E, using a sample thickness of 0.15+/−0.020 in. The elongation should be a minimum of 70% at 190+/−20° F. when tested per ASTM D3574 test E, using a sample thickness of 0.15+/−0.020 in. The tear resistance should be a minimum average of 70 lbs. per in. at 190+/−20° F. The flexural creep should be 1.80% maximum average at 190+/−20° F.

2. Dimensions

In this section, a preferred construction is described in detail. It should e understood, of course, that these are examples of preferred dimensions only. A variety of arrangements and dimensions may be used, while still practicing the principles of the invention.

The jacket 10 would have a length of between about 600–800 mm, for example 650–700 mm. It would have a diameter of between 100–300 mm, for example 175–225 mm. The bead 98 would be spaced from the end 82 about 5–50 mm, for example 7–20 mm. The bead 98 would project from the wall 90 about 0.5–10 mm, for example 1–5 mm. The lip 98 would project from the wall 90 about 2–30 mm, for example 3–15 mm.

The element 11 would have a length of about 650–850 mm, for example 675–775 mm. The media 35 would have an overall length of between 600–750 mm, for example 650–700 mm. The diameter at the inlet end of the media 35 would be about 150–200 mm, while the diameter at the outlet end of the media 35 would be about 125–175 mm. The media 35 would slope at an angle between the inlet end and outlet end less than 10°, for example 0–5°, and preferably under 1°. The media 35 would have a pleat depth of between 20–50 mm, for example 35–40 mm. The media 35 would have an overall cross-sectional area of between 5–10 m$^2$, for example 6–8 m$^2$.

In constructions such as those shown in FIG. 12, the pleat depth would be between 15–45 mm, for example 25–30 mm. The media would have an overall cross-sectional area of between 4–8 m$^2$, for example 5.5–6.5 m$^2$.

The outlet end cap 25 would have a length for tube 68 of between 20–100 mm, for example 30–60 mm. The overall diameter of the end cap 25 would be between 100–300 mm, for example 175–225 mm. The inner diameter of the tube 68 would be between 50–150 mm, for example 80–120 mm.

The second end cap 30 would have between 2–10 radial spacers 43, for example 3 radial spacers 43, spaced 120° apart. The second end cap 30 would have 1–20 axial spacers 31, for example 3 axial spacers, spaced 120° apart. The diameter of the main section 56 would be between 100–200 mm, for example 140–180 mm.

The width of the radial projection section 59 would be between 10–100 mm, for example 25–35 mm. The length of the radial projection section 59 from the perimeter 57 would be between 5–50 mm, for example 10–30 mm. The thickness of the radial projection section 59 would be between 5–10 mm.

The height of each of the axial projections 58 from the planar section 65 would be between 5–10 mm, or for example 10–30 mm. The width of each of the axial projections 58 would be between 5–100 mm, for example 7–30 mm.

The above specification, examples and data provide a complete description of principles of the invention. Many embodiments of the invention can be made without departing from the spirit and scope of principles of the invention.

I claim:

1. An air cleaner assembly comprising:
   (a) a filter element comprising first and second end caps with a region of media extending therebetween;
      (i) said region of media being constructed and arranged to define an internal, open volume;
      (ii) said first end cap having a central opening therein, in air flow communication with said internal, open volume;
      (iii) said second end cap being a closed end cap, having a main section defining a periphery, said second end cap having a plurality of spaced, radially directed projections extending beyond the periphery;
   (b) an outer jacket defining an open interior and having first and second opposite open ends;
      (i) said jacket being sized and configured to extend between said first and second end caps and with said media enclosed within said jacket interior;
      (ii) said jacket being selectively mountable and dismountable on said filter element upon axial movement of at least one of said jacket and element relative to the other;
      (iii) said jacket including a locking member positioned to selectively engage said jacket with said second end cap radial projections and to secure said jacket on said filter element; and
      (iv) said radial projections engaging said jacket and supporting said jacket spaced from a remainder of said second end cap sufficiently to provide an air flow inlet arrangement for flow of air between:
         (A) a volume in said jacket interior and circumscribing said filter element; and,
         (B) a region exterior of said assembly.

2. An air cleaner assembly according to claim 1 wherein:
   (a) said region of media has a frustoconical configuration.

3. An air cleaner assembly according to claim 1 wherein:
   (a) said region of media has a cylindrical configuration.

4. An air cleaner assembly according to claim 1 wherein:
   (a) said second end cap includes at least three radially directed projections extending beyond the periphery and oriented to support said jacket and to provide at least three air flow gaps between said jacket and said second end cap.

5. An air cleaner assembly according to claim 4 wherein:
   (a) each projection is sufficiently large, and said outer jacket is sufficiently large, to provide each air flow gap with a perimeter width of at least 10 mm.

6. An air cleaner assembly according to claim 1 wherein:
(a) said second end cap includes at least three outer axial spacers thereon.

7. An air cleaner assembly according to claim 6 wherein:
(a) each of said axial spacers extends over an axial distance of at least 10 mm from a remainder of said second end cap.

8. An air cleaner assembly according to claim 1 wherein:
(a) said locking member on said jacket comprises a contoured portion along an inner wall portion of said jacket;
   (i) each of said second end cap radial projections selectively engaging said contoured portion to secure said jacket on said filter element.

9. An air cleaner assembly according to claim 8 wherein:
(a) said contoured portion of said jacket comprises a radially inwardly extending protrusion;
   (i) each of said second end cap radial projections including a flange member selectively engaging said protrusion.

10. An air cleaner assembly according to claim 9 wherein:
(a) said radially inwardly extending protrusion comprises a bead circumferentially lining the inner wall of said jacket adjacent to said second open end of said jacket;
   (i) each of said flange members of said second end cap radial projections including an outer edge for selective engagement against said bead.

11. An air cleaner assembly according to claim 1 wherein:
(a) said first open end of said jacket includes a depending lip lining a periphery of said first open end;
   (i) said first end cap engaging said depending lip when said jacket is secured on said filter element.

12. An air cleaner assembly according to claim 1 including:
(a) an inner liner extending between said first and second end caps supporting said region of media; and
(b) an outer liner extending between said first and second end caps supporting said region of media.

13. An air cleaner assembly according to claim 1 wherein:
(a) said region of media comprises pleated cellulose including between 120–160 pleats.

14. An air cleaner assembly according to claim 2 wherein:
(a) said jacket is cylindrical; and
(b) said airflow inlet arrangement includes a dirty air plenum; said dirty air plenum having a frustoconical configuration.

15. A filter element arrangement comprising:
(a) a first end cap at a first end; said first end cap defining an airflow opening therethrough;
(b) a second end cap at a second end opposite of said first end; said second end cap including: a main section defining a periphery; a plurality of radial projections; and a plurality of axial projections extending from a remainder of said second end cap;
   (i) said radial projections being spaced to define airflow channels therebetween;
   (ii) each of said radial projections extending from said main section beyond said periphery;
   (iii) each of said axial projections extending axially at least 10 mm from the remainder of said second end cap; and
(c) an extension of filter media extending between said first and second end caps and defining an open filter interior;
   (i) said open filter interior being in airflow communication with said airflow opening in said first end cap.

16. A filter element arrangement according to claim 15 wherein:
(a) each of said radial projections includes a flange extending at least 10 mm from said main section; and
(b) each of said axial projections is aligned with and projects from a respective one of said radial projections.

17. A filter element arrangement according to claim 16 wherein:
(a) said first end cap includes a tube member circumscribing said airflow opening; said tube member projecting at least 10 mm from a remaining portion of said first end cap.

18. A filter element arrangement according to claim 17 including:
(a) an inner liner extending between said first and second end caps;
(b) an outer liner extending between said first and second end caps; and wherein,
(c) said extension of filter media has a frustoconical configuration;
   (i) said filter media comprising pleated media.

19. An engine air flow system comprising:
(a) an engine having a rated air flow of at least 2 $m^3$/min;
(b) an air filter assembly mounted on a framework and arranged to filter engine intake air to the engine; said air filter assembly comprising:
   (i) a filter element comprising first and second end caps with a region of media extending therebetween;
      (A) said region of media being constructed and arranged to define an internal, open volume;
      (B) said first end cap having a central opening therein, in air flow communication with: said internal, open volume; and an air intake duct for said engine;
      (C) said second end cap being a closed end cap, having a main section defining a periphery, said second end cap having a plurality of spaced, radially directed projections extending beyond the periphery;
   (ii) an outer jacket defining an open interior and having first and second opposite open ends;
      (A) said jacket being sized and configured to extend between said first and second end caps and with said media enclosed within said jacket interior;
      (B) said jacket being selectively mountable and dismountable on said filter element upon axial movement of at least one of said jacket and element relative to the other;
      (C) said jacket including a locking member positioned to selectively engage said jacket with said second end cap radial projections and to secure said jacket on said filter element; and
      (D) said radial projections engaging said jacket and supporting said jacket spaced from a remainder of said second end cap sufficiently to provide an air flow inlet arrangement for flow of air between:
         (i) a volume in said jacket interior and circumscribing said filter element; and,
         (ii) a region exterior of said assembly.

20. An engine airflow system according to claim 19 wherein:
(a) said second end cap includes at least three radially directed projections oriented to support said jacket and to provide at least three air flow gaps between said jacket and said second end cap; and (b) said locking member on said jacket comprises a bead circumferentially lining an inner wall of said jacket adjacent to said second open end of said jacket;
   (i) each of said second end cap radial projections selectively engaging said bead.

21. A method for installing a filter element in an air cleaner comprising:
   (a) providing a housing defining an open interior and having a locking member;
   (b) orienting a filter element, having a plurality of radial projections configured to selectively engage with the locking member, into the open interior of the housing including:
      (i) tilting the filter element at an angle relative to a longitudinal axis of the housing; and
      (ii) after tilting the filter element, straightening the filter element and axially moving one of the element and the housing relative to the other to position the element inside of the housing; and
      (iii) engaging the radial projections and the locking member to secure the element in the housing.

22. A method according to claim 21, wherein:
   (a) said step of axially moving one of the element and the housing includes moving the housing relative to the filter element.

23. A method according to claim 21, wherein:
   (a) said step of engaging the radial projections and the locking member includes deflecting the radial projections to move the radial projections over a bead in the housing.

24. A method according to claim 23, wherein:
   (a) said step of deflecting the radial projections includes exerting a force on the housing no greater than 40 kg.

25. A method according to claim 21, further including:
   (a) after said step of straightening the filter element and before axially moving one of the element and the housing relative to the other, inverting an assembly including the filter element and the housing.

26. A method according to claim 25, further including:
   (a) after said step of inverting an assembly, orienting the assembly to rest axial spacers of the filter element on a surface.

27. A method according to claim 21, wherein:
   (a) said step of tilting the filter element includes tilting the filter element at an angle between 15 and 30 degrees relative to a longitudinal axis of the housing.

* * * * *